(12) United States Patent
Chi

(10) Patent No.: US 12,066,516 B2
(45) Date of Patent: Aug. 20, 2024

(54) RADAR APPARATUS AND SIGNAL PROCESSING METHOD THEREOF

(71) Applicant: RichWave Technology Corp., Taipei (TW)

(72) Inventor: Hsiang-Feng Chi, Taipei (TW)

(73) Assignee: RichWave Technology Corp., Taipei (TW)

( * ) Notice: Subject to any disclaimer, the term of this patent is extended or adjusted under 35 U.S.C. 154(b) by 276 days.

(21) Appl. No.: 17/472,679

(22) Filed: Sep. 12, 2021

(65) Prior Publication Data

US 2023/0014043 A1     Jan. 19, 2023

(30) Foreign Application Priority Data

Jul. 14, 2021  (TW) .................................. 110125896

(51) Int. Cl.
*G01S 13/34* (2006.01)
*G01S 7/35* (2006.01)
*H04B 1/44* (2006.01)

(52) U.S. Cl.
CPC .............. *G01S 13/34* (2013.01); *G01S 7/352* (2013.01); *H04B 1/44* (2013.01); *G01S 7/358* (2021.05); *G01S 13/343* (2013.01); *G01S 13/345* (2013.01)

(58) Field of Classification Search
CPC .......... G01S 13/34; G01S 7/352; G01S 7/358; G01S 13/343; G01S 13/345; H04B 1/44

(Continued)

(56) References Cited

U.S. PATENT DOCUMENTS 4,912,472 A * 3/1990 Reits ...................... G01S 13/343
                                                                342/128
5,079,556 A * 1/1992 Itoh ......................... G01S 13/20
                                                                342/134

(Continued)

FOREIGN PATENT DOCUMENTS

CN       103728593        10/2015
CN       106716887 A  *  5/2017  ........... H04B 17/309

(Continued)

OTHER PUBLICATIONS

"Notice of allowance of Taiwan Counterpart Application", issued on Apr. 11, 2022, p. 1-p. 4.

*Primary Examiner* — Nuzhat Pervin
(74) *Attorney, Agent, or Firm* — JCIPRNET

(57) ABSTRACT

A radar apparatus includes a transmitting analog front-end circuit, a plurality of antenna ports, a switching controller, a switching circuit, and a receiving analog front-end circuit. The transmitting analog front-end circuit generates a transmitting signal according to a carrier wave signal. A frequency of the carrier wave signal changes with time during a frequency sweep period of the carrier wave signal. The antenna ports are respectively configured to receive an echo signal corresponding to the transmitting signal. The switching controller is coupled to the transmitting analog front-end circuit and configured to generate a control signal according to the frequency sweep period of the carrier wave signal. The switching circuit is coupled to the antenna ports and the switching controller, configured to select one of the antenna ports to receive the echo signal according to the control signal, and coupled to the receiving analog front-end circuit.

20 Claims, 11 Drawing Sheets

(58) Field of Classification Search
USPC .......................................................... 342/200
See application file for complete search history.

(56) References Cited

U.S. PATENT DOCUMENTS

| | | | | |
|---|---|---|---|---|
| 5,389,930 | A * | 2/1995 | Ono | G01S 7/022 455/343.1 |
| 5,561,686 | A * | 10/1996 | Kobayashi | H04L 5/026 375/E1.033 |
| 5,608,404 | A * | 3/1997 | Burns | G01S 13/9027 342/25 A |
| 6,587,072 | B1 * | 7/2003 | Gresham | G01S 13/106 342/25 R |
| 6,930,631 | B2 * | 8/2005 | Puglia | G01S 7/352 342/21 |
| 8,275,071 | B2 * | 9/2012 | Shen | H04L 27/3845 375/316 |
| 8,705,604 | B2 * | 4/2014 | Goodman | H04L 27/01 375/232 |
| 9,231,680 | B2 * | 1/2016 | Gorbachov | H04B 7/0817 |
| 9,689,967 | B1 * | 6/2017 | Stark | G01S 7/0233 |
| 9,791,564 | B1 * | 10/2017 | Harris | G01S 13/931 |
| 9,838,069 | B2 * | 12/2017 | Emmanuel | H04B 1/48 |
| 10,469,123 | B2 * | 11/2019 | Emmanuel | H04B 1/48 |
| 10,735,035 | B1 * | 8/2020 | Gambini | G01S 7/03 |
| 10,914,818 | B2 * | 2/2021 | Schoor | G01S 13/426 |
| 11,016,169 | B2 * | 5/2021 | Vossiek | G01S 7/4021 |
| 11,483,081 | B2 * | 10/2022 | Hwang | H04W 24/10 |
| 11,579,280 | B2 * | 2/2023 | Kurvathodil | G01S 13/02 |
| 11,601,158 | B2 * | 3/2023 | Wala | H04B 1/44 |
| 11,644,530 | B2 * | 5/2023 | Melzer | G01S 7/40 342/169 |
| 11,693,085 | B2 * | 7/2023 | Meissner | G01S 7/023 342/21 |
| 11,693,106 | B2 * | 7/2023 | Lang | G01S 13/343 342/109 |
| 11,796,628 | B2 * | 10/2023 | Nayyar | G01S 7/352 |
| 11,885,903 | B2 * | 1/2024 | Meissner | G01S 7/417 |
| 2003/0100285 | A1 * | 5/2003 | Puglia | G01S 7/352 342/21 |
| 2003/0193430 | A1 * | 10/2003 | Gresham | G01S 7/288 342/134 |
| 2008/0285684 | A1 * | 11/2008 | Shen | H03D 3/007 375/324 |
| 2010/0085992 | A1 * | 4/2010 | Rakuljic | G01S 7/4911 372/20 |
| 2010/0225414 | A1 * | 9/2010 | Gorbachov | H04B 7/0817 333/101 |
| 2010/0226291 | A1 * | 9/2010 | Gorbachov | H04B 1/48 370/280 |
| 2010/0226292 | A1 * | 9/2010 | Gorbachov | H04B 1/48 370/280 |
| 2011/0130800 | A1 * | 6/2011 | Weinstein | A61N 1/36578 600/509 |
| 2012/0200446 | A1 * | 8/2012 | Shirakawa | G01S 7/40 342/27 |
| 2012/0262330 | A1 * | 10/2012 | Park | G01S 13/584 342/109 |
| 2012/0330151 | A1 * | 12/2012 | Weinstein | A61B 8/4254 600/425 |
| 2013/0089130 | A1 * | 4/2013 | Shen | H03D 3/007 375/340 |
| 2014/0035773 | A1 * | 2/2014 | Cheng | G01S 11/10 342/21 |
| 2014/0039718 | A1 * | 2/2014 | Cheng | G01S 11/10 701/1 |
| 2015/0118977 | A1 * | 4/2015 | Emmanuel | H04B 1/48 455/83 |
| 2015/0226848 | A1 * | 8/2015 | Park | G01S 13/584 342/93 |
| 2016/0306034 | A1 * | 10/2016 | Trotta | G01S 13/343 |
| 2017/0176573 | A1 * | 6/2017 | Lynch | G01S 7/0232 |
| 2018/0011181 | A1 * | 1/2018 | Urakawa | G01S 13/343 |
| 2018/0048493 | A1 * | 2/2018 | Bordes | G01S 13/00 |
| 2018/0062694 | A1 * | 3/2018 | Emmanuel | H04B 1/48 |
| 2018/0175898 | A1 * | 6/2018 | Kollmann | H01P 5/12 |
| 2018/0210076 | A1 * | 7/2018 | Takada | G01S 7/4913 |
| 2019/0018127 | A1 * | 1/2019 | Guarin Aristizabal | G01S 13/88 |
| 2020/0116849 | A1 * | 4/2020 | Wennersten | G01S 7/352 |
| 2020/0124699 | A1 * | 4/2020 | Meissner | G01S 13/0209 |
| 2020/0132804 | A1 * | 4/2020 | Yeh | G01S 7/352 |
| 2020/0287587 | A1 * | 9/2020 | Cheung | G01S 7/52 |
| 2021/0173042 | A1 * | 6/2021 | Wu | G01S 7/356 |
| 2021/0181326 | A1 * | 6/2021 | Kurvathodil | G01S 13/931 |
| 2021/0184722 | A1 * | 6/2021 | Wala | H04B 17/354 |
| 2021/0242897 | A1 * | 8/2021 | Arfaei Malekzadeh | H03F 3/245 |
| 2021/0364616 | A1 * | 11/2021 | Wang | G01S 13/584 |
| 2022/0107385 | A1 * | 4/2022 | Melzer | G01S 13/34 |
| 2022/0196796 | A1 * | 6/2022 | Fiore | G01S 13/581 |
| 2022/0321150 | A1 * | 10/2022 | Ehrentraut | H04B 1/0067 |
| 2023/0008841 | A1 * | 1/2023 | Cheung | G01S 7/352 |
| 2023/0123458 | A1 * | 4/2023 | Wise | G01S 13/347 342/128 |
| 2023/0126949 | A1 * | 4/2023 | Long | G01S 13/345 342/128 |
| 2023/0142169 | A1 * | 5/2023 | Lugitsch | G01S 13/878 342/192 |
| 2023/0208470 | A1 * | 6/2023 | Wala | H04B 1/44 375/267 |

FOREIGN PATENT DOCUMENTS

| | | | | |
|---|---|---|---|---|
| EP | 1316813 | B1 * | 3/2006 | G01S 7/352 |
| EP | 2350684 | B1 * | 2/2016 | G01S 7/354 |
| EP | 3070490 | A1 * | 9/2016 | G01S 13/08 |
| EP | 3572828 | A1 * | 11/2019 | G01S 13/24 |
| EP | 3540970 | B1 * | 9/2020 | H01Q 1/243 |
| EP | 3745608 | | 12/2020 | |
| TW | 201909552 | | 3/2019 | |
| WO | 03034087 | | 4/2003 | |

* cited by examiner

RADAR APPARATUS AND SIGNAL PROCESSING METHOD THEREOF

CROSS-REFERENCE TO RELATED APPLICATION

This application claims the priority benefit of Taiwan application serial no. 110125896, filed on Jul. 14, 2021. The entirety of the above-mentioned patent application is hereby incorporated by reference herein and made a part of this specification.

BACKGROUND

Technical Field

The disclosure relates to radar technology, and more particularly to a radar apparatus and a signal processing method thereof applied to an array receiving antenna.

Description of Related Art

Radar technology has been developed for many years. According to the type of the transmitting signal, radars may be divided into two categories: pulse radars and continuous wave radars. Conventional pulse radars emit periodic high-frequency pulses. Continuous wave radars emit continuous wave signals. With the rapid development of science and technology, in recent years, frequency-modulated continuous wave (FMCW) radars have been widely used in various fields.

FMCW radars transmit continuous waves with varying frequencies during the frequency sweep period. There is a certain frequency difference between the echo of the continuous wave reflected by an object and the transmitting signal, and the distance between the object and the radar may be determined based on this frequency difference. Because FMCW radars may measure the distance and the speed of moving targets, FMCW radars have gradually been widely used in civil fields such as road vehicle monitoring and recording systems, automobile collision avoidance radars, traffic flow detectors, and autonomous driving.

It is worth noting that FMCW radar systems may estimate the angle, also known as angle-of-arrival (AoA), of the reflected signal using array antennas. When the distance between the radar system and the object has a very small change, a larger change occurs in the phase at the spectral peak. Therefore, AoA may be estimated using the phase change corresponding to the distance difference between the object and the adjacent antennas.

However, in order to use an array antenna, the current FMCW radar systems estimating AoA adopt a multi-receiver architecture. FIG. 1 is a schematic diagram of a conventional FMCW radar system adopting multiple receivers. Please refer to FIG. 1, an existing FMCW radar system 1 may include a transmitter Tx and a plurality of receivers Rx. The transmitter Tx may transmit a transmitting signal via an antenna At, and the receivers Rx may respectively receive the echo signals of the transmitting signal reflected by an object via a plurality of receiving antennas At.

In general, when sensing a plurality of channels (respectively corresponding to the plurality of transmit antennas At), code division multiplexing (CDM), frequency-division multiplexing (FDM), or time-division multiplexing (TDM) may be adopted. For CDM, the transmitting signal is the sum of spread-spectrum signals corresponding to a plurality of spread codes. For FDM, a plurality of digital-IF signals may be modulated to one transmitting signal. Both CDM and FDM require a plurality of synchronized receivers to process a plurality of de-multiplexed signals at the same time. However, the hardware architecture of a plurality of synchronized receivers results in huge hardware costs.

SUMMARY

An embodiment of the disclosure provides a radar apparatus. The radar apparatus includes a transmitting analog front-end circuit, a plurality of antenna ports, a switching controller, a switching circuit, and a receiving analog front-end circuit. The transmitting analog front-end circuit is configured to generate a transmitting signal according to a carrier wave signal. A frequency of the carrier wave signal changes with time during a frequency sweep period of the carrier wave signal. The plurality of antenna ports are respectively configured to receive an echo signal corresponding to the transmitting signal. The switching controller is coupled to the transmitting analog front-end circuit. The switching controller is configured to generate a control signal according to the frequency sweep period of the carrier wave signal. The switching circuit is coupled to the plurality of antenna ports and the switching controller. The switching circuit is configured to select one of the plurality of antenna ports to receive the echo signal according to the control signal. The echo signal is generated by a reflection of the transmitting signal by an object. The receiving analog front-end circuit is coupled to the switching circuit and configured to receive a radio frequency signal according to the carrier wave signal.

Moreover, an embodiment of the disclosure provides a signal processing method suitable for a radar apparatus having a plurality of antenna ports. The signal processing method includes the following steps. A control signal is generated according to a frequency sweep period of a carrier wave signal, wherein a frequency of the carrier wave signal changes with time during the frequency sweep period of the carrier wave signal. One of a plurality of antenna ports is selected to receive an echo signal corresponding to a transmitting signal according to the control signal.

In order to make the aforementioned features of the disclosure more comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 2A:
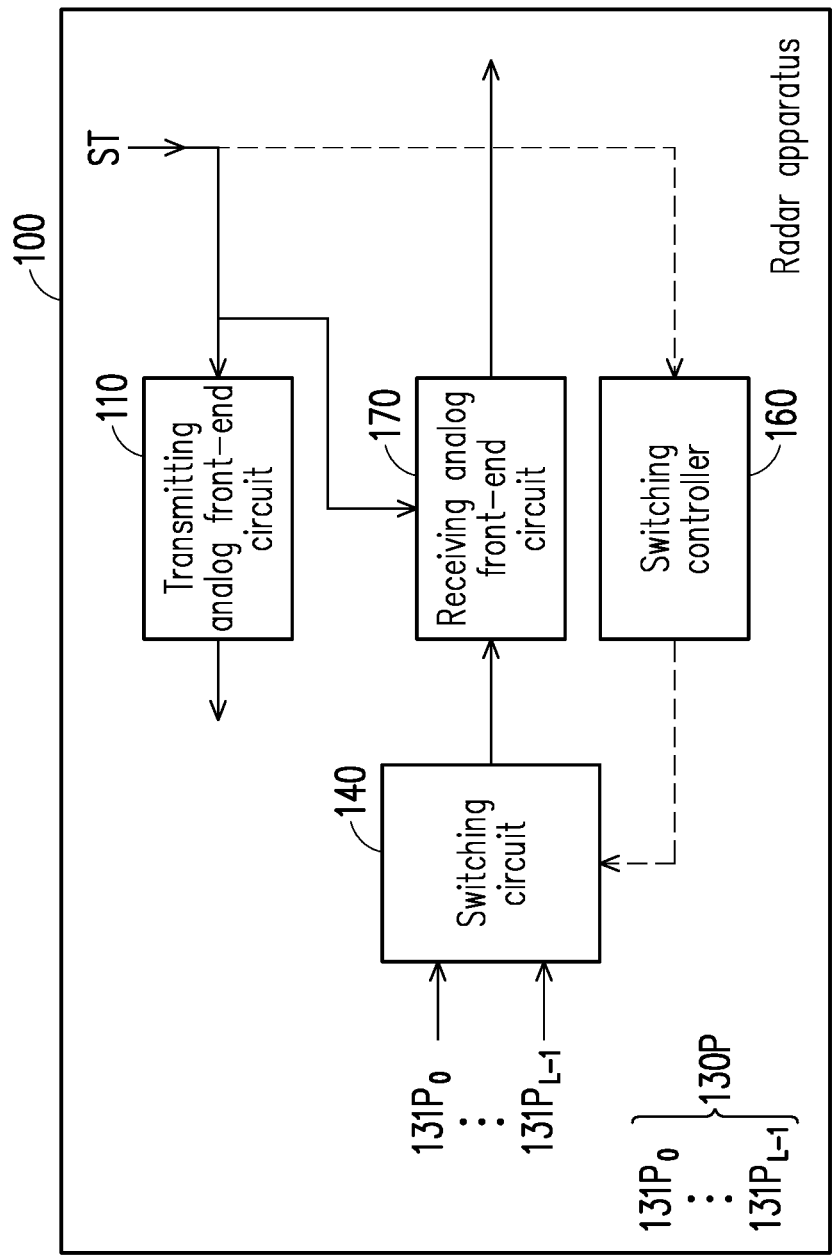
FIG. 2A and FIG. 2B are schematic diagrams of a radar apparatus according to an embodiment of the disclosure.
Figure 2B:
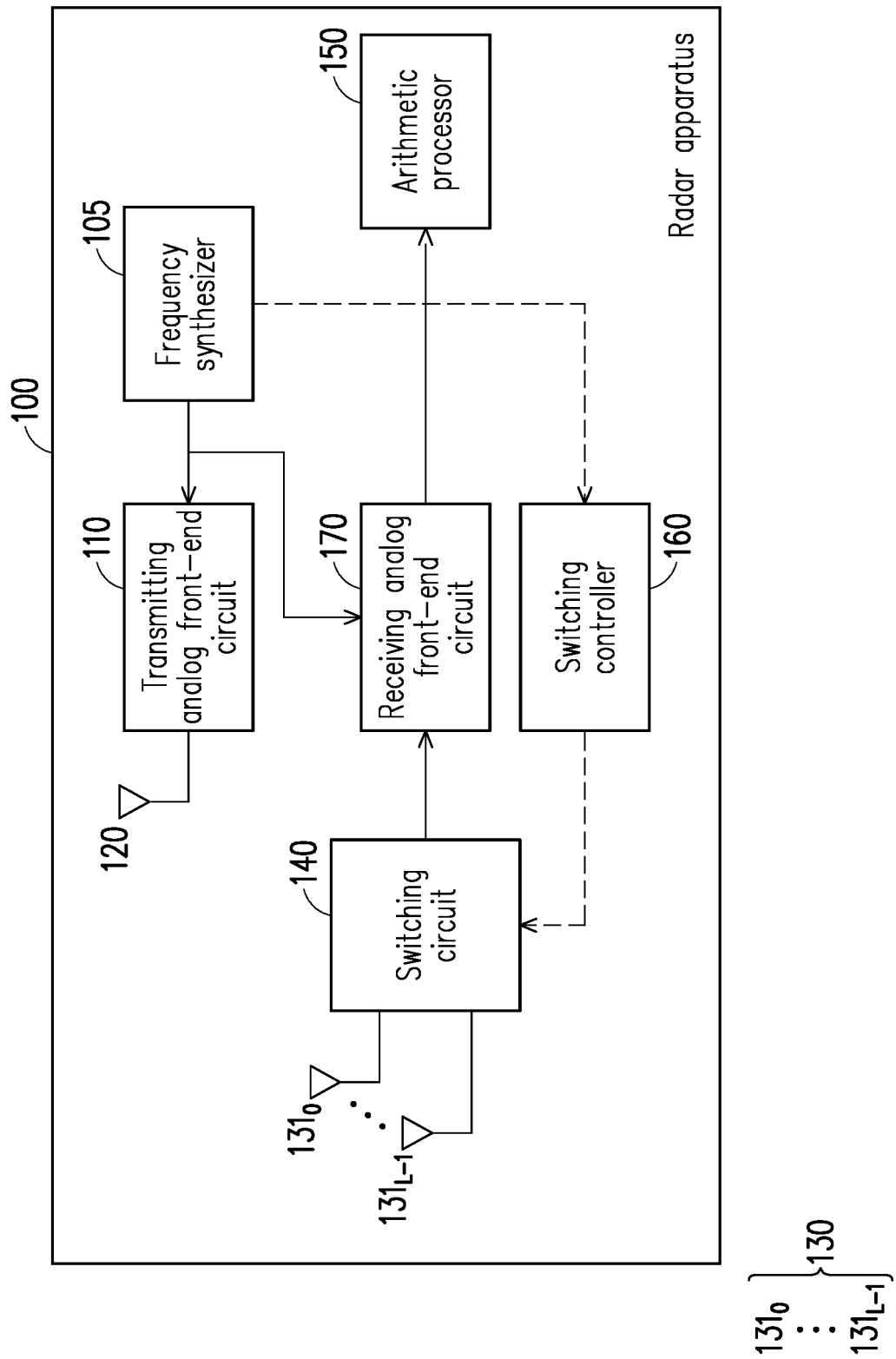

FIG. 2A and FIG. 2B are schematic diagrams of a radar apparatus 100 according to an embodiment of the disclosure. Referring to FIG. 2A, a radar apparatus 100 includes (but is not limited to) a transmitting analog front-end circuit 110, a plurality of antenna ports 130P, a switching circuit 140, a switching controller 160, and a receiving analog front-end circuit 170. Referring to FIG. 2B, in an embodiment, the radar apparatus 100 further includes a frequency synthesizer 105, a transmitting antenna 120, an antenna array 130, and/or an arithmetic processor 150. The antenna array 130 includes a plurality of receiving antennas $131_0$ to $131_{L-1}$ and is respectively coupled to the corresponding antenna ports $131_0$ to $131_{L-1}$. The antenna ports $131_0$ to $131_{L-1}$ share a receiving analog front-end circuit 170 through the switching circuit 140. The radar apparatus 100 may be applied to fields such as meteorology, speed detection, reversing vehicles, topography, military, etc., for example.

The transmitting analog front-end circuit 110, the switching controller 160, and the receiving analog front-end circuit 170 are configured to generate corresponding operations according to a carrier wave signal ST. The frequency synthesizer 105 may be configured to generate the carrier wave signal ST. The frequency synthesizer 105 is coupled to the transmitting analog front-end circuit 110, the switching controller 160, and the receiving analog front-end circuit 170. The frequency synthesizer 105 may be disposed outside the radar apparatus 100 or integrated in the radar apparatus 100.

Figure 3A:
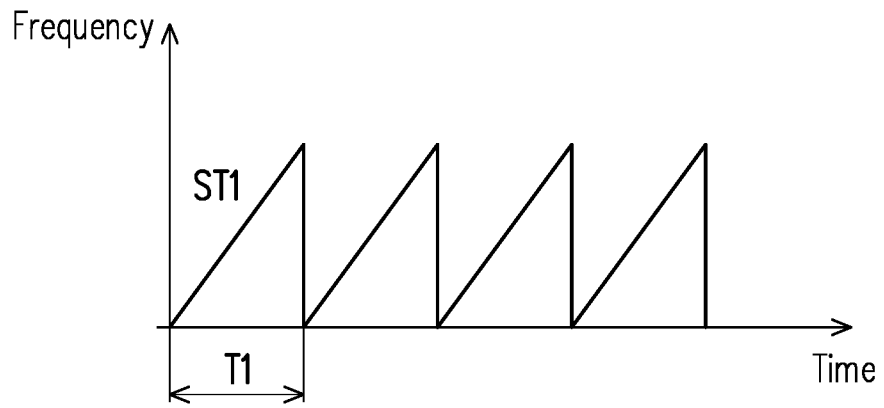
FIG. 3A and FIG. 3B are schematic diagrams of a carrier wave signal according to an embodiment of the disclosure.

The transmitting analog front-end circuit 110 may be configured to generate a transmitting signal according to the carrier wave signal ST. Since the frequency of the carrier wave signal ST changes with time during the frequency sweep period of the carrier wave signal ST, the frequency of the transmitting signal correspondingly changes with time during the frequency sweep period of the carrier wave signal ST. For example, FIG. 3A is a schematic diagram of a carrier wave signal ST1 according to an embodiment of the disclosure. Please refer to FIG. 3A. In the present embodiment, the instantaneous frequency of the carrier wave signal ST1 may be a sawtooth wave as shown in FIG. 3A. The frequency of the carrier wave signal ST1 changes with time. For example, the frequency of the carrier wave signal ST1 is gradually increased within a waveform period T1. The waveform period T1 of each sawtooth wave is the frequency sweep period.

Figure 3B:
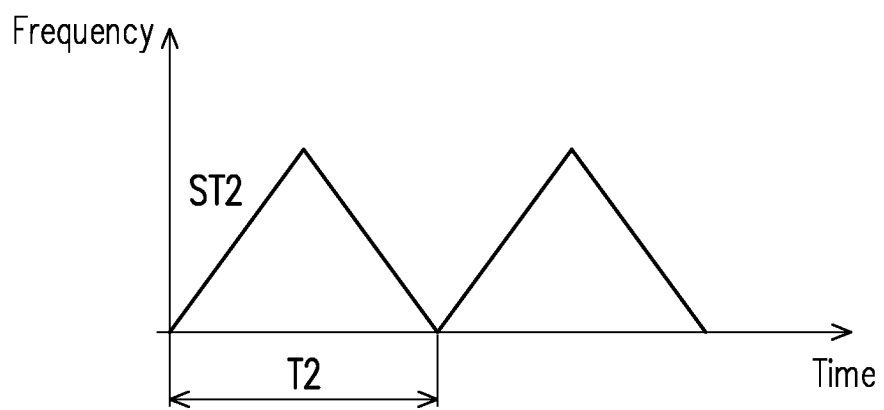

FIG. 3B is a schematic diagram of a carrier wave signal ST2 according to an embodiment of the disclosure. In the present embodiment, the instantaneous frequency of the carrier wave signal ST2 is a triangle wave. The frequency of the carrier wave signal ST2 may change with time. For example, the frequency of the carrier wave signal ST2 is gradually increased in the first half of a waveform period T2 and gradually decreased in the second half of the waveform period T2. The waveform period T2 of each triangle wave is the frequency sweep period.

It should be mentioned that the instantaneous frequency of the carrier wave signal ST is not limited to a sawtooth wave or a triangle wave, and the carrier wave signal ST may also be other carrier wave signals (for example, linear, geometric, step increase, or other chirp signals) applied to a frequency-modulated continuous wave (FMCW).

The transmitting antenna 120 is coupled to the transmitting analog front-end circuit 110. The transmitting antenna 120 may be configured to transmit the transmitting signal generated by the transmitting analog front-end circuit 110. As mentioned above, the frequency of the transmitting signal also correspondingly changes with the frequency of the carrier wave signals ST, ST1, and ST2.

The antenna array 130 includes the plurality of receiving antennas $131_0$ to $131_{L-1}$. The receiving antennas $131_0$ to $131_{L-1}$ are respectively configured to receive an echo signal corresponding to the transmitting signal and are coupled to corresponding antenna ports $131P_0$ to $131P_{L-1}$. L is a positive integer and represents the number of the receiving antennas $131_0$ to $131_{L-1}$ and the corresponding antenna ports $131P_0$ to $131P_{L-1}$. For example, L is 2, 4, or 8, but is not limited thereto.

Figure 4:
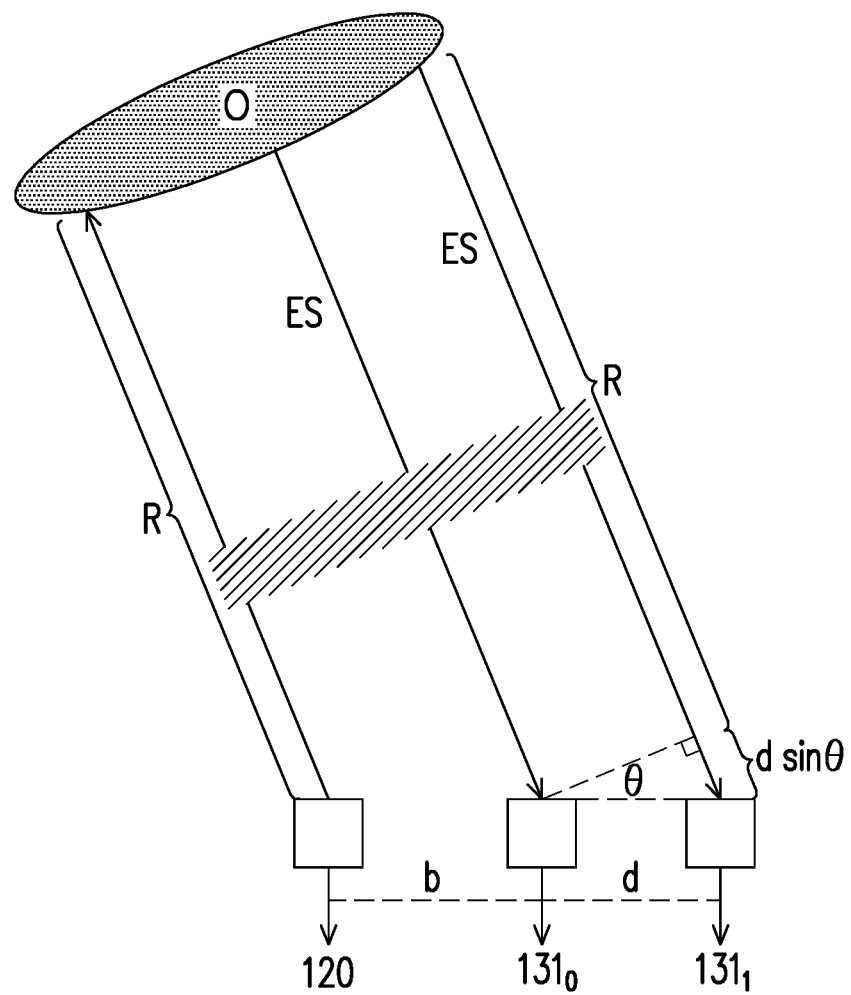
FIG. 4 is a schematic diagram illustrating receiving antennas receiving echo signals according to an embodiment of the disclosure.

For example, FIG. 4 is a schematic diagram illustrating the receiving antennas $131_0$ to $131_{L-1}$ receiving echo signals according to an embodiment of the disclosure. The radar apparatus 100 may transmit a transmitting signal to an external object O (also referred to as a target) via the transmitting antenna 120. In this case, the antenna array 130 includes two receiving antennas $131_0$ to $131_1$. The radar apparatus 100 may receive echo signals ES reflected from the external object O via the receiving antennas $131_0$ to $131_1$ and the corresponding two antenna ports $131P_0$ to $131P_1$.

The switching circuit 140 is coupled to an L number of antenna ports $131P_0$ to $131P_{L-1}$ corresponding to the receiving antennas $131_0$ to $131_{L-1}$. In an embodiment, the switching circuit 140 is configured to select one of the L number of antenna ports $131P_0$ to $131P_{L-1}$ corresponding to the receiving antennas $131_0$ to $131_{L-1}$ to receive the echo signals.

Figure 5:
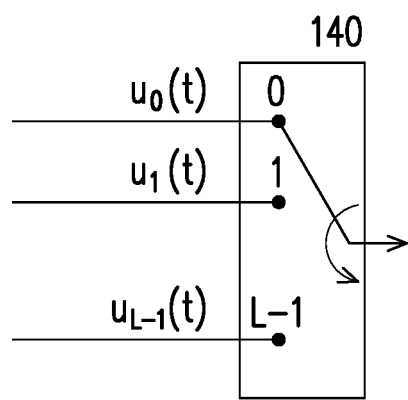
FIG. 5 is a schematic diagram of a switching circuit according to an embodiment of the disclosure.

For example, FIG. 5 is a schematic diagram of the switching circuit 140 according to an embodiment of the disclosure. The switching circuit 140 may be a combination of one or a plurality of electrical components such as multiplexers and switches, and the embodiments of the disclosure are not limited in this regard. In an embodiment, the switching circuit 140 may switch between radio frequency signals $u_0(t)$ to $u_{L-1}(t)$ respectively received by the L number of antenna ports $131P_0$ to $131P_{L-1}$ corresponding to the L number of receiving antennas $131_0$ to $131_{L-1}$.

The arithmetic processor 150 may be a chip, a processor, a microcontroller, an application-specific integrated circuit (ASIC), or any type of digital circuit. The arithmetic processor 150 is coupled to the receiving analog front-end circuit 170. In an embodiment, the arithmetic processor 150 is configured to determine the position information of an external object.

The switching controller 160 is coupled to the frequency synthesizer 105 and the switching circuit 140, and is configured to generate a control signal according to the frequency sweep period of the carrier wave signal ST. In an embodiment, the switching controller 160 is configured to generate a control signal controlling the switching circuit 140.

In an embodiment, the receiving analog front-end circuit 170 is coupled to the frequency synthesizer 105, the switching circuit 140, and the arithmetic processor 150. In an embodiment, the receiving analog front-end circuit 170 is configured to receive and process the radio frequency signals according to the carrier wave signal ST. Taking FIG. 5 as an example, the radio frequency signal may be one of the radio frequency signals $u_0(t)$ to $u_{L-1}(t)$ received from the L number of antenna ports $131P_0$ to $131P_{L-1}$ corresponding to the receiving antennas $131_0$ to $131_{L-1}$ of the antenna array 130.

The detailed hardware architectures of the transmitting analog front-end circuit 110 and the receiving analog front-end circuit 170 are described in more detail below in conjunction with FIG. 6A and FIG. 6B.

Figure 6A:
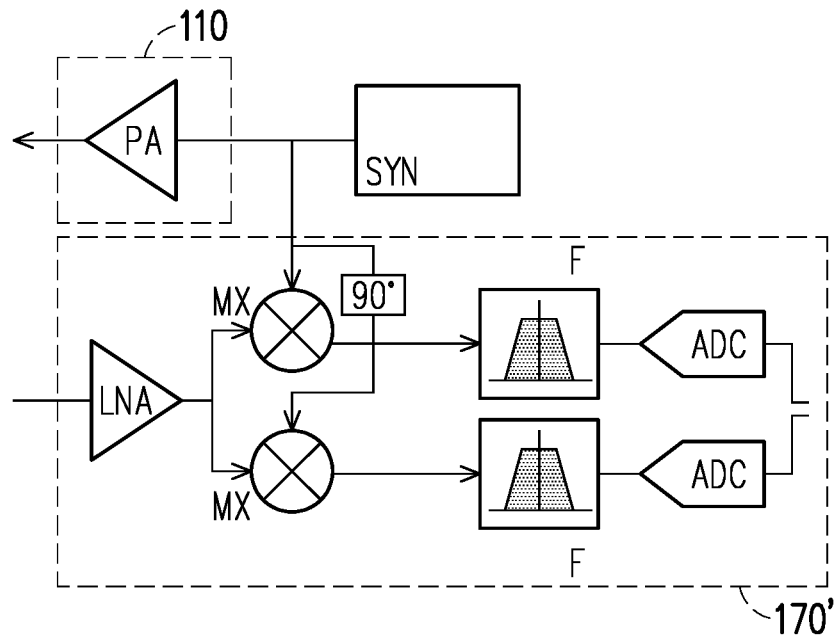
FIG. 6A is a schematic diagram of a transmitting analog front-end circuit and a receiving analog front-end circuit according to an embodiment of the disclosure.

FIG. 6A is a schematic diagram of the transmitting analog front-end circuit 110 and a receiving analog front-end circuit 170' according to an embodiment of the disclosure. The transmitting analog front-end circuit 110 includes an amplifier PA. The receiving analog front-end circuit 170' includes a low-noise amplifier LNA, mixers MX, filters F, and analog-to-digital converters ADC.

A frequency synthesizer SYN is configured to generate the carrier wave signal ST. The amplifier PA is coupled to the frequency synthesizer SYN and is configured to amplify and output the radio frequency signal and transmit the radio frequency signal to the outside via the transmitting antenna 120. The low-noise amplifier LNA is coupled to the output terminal of the switching circuit 140 and configured to receive the radio frequency signal output by the switching circuit 140 (for example, one of the radio frequency signals $u_0(t)$ to $u_{L-1}(t)$ received by the receiving antennas $131_0$ to $134_{L-1}$ shown in FIG. 5). Each of the mixer MX is coupled to the low-noise amplifier LNA and configured to mix the radio frequency signal according to the carrier wave signal ST generated by the frequency synthesizer SYN with/without a 90 degree phase shift to generate an intermediate frequency signal respectively. Each of the filter F is coupled to the mixer MX and configured to filter the in-phase component signal and the quadrature component of the intermediate frequency signal respectively. Each of the analog-to-digital converter ADC is coupled to the mixer MX and configured to generate a baseband signal according to the intermediate frequency signal respectively.

Figure 6B:
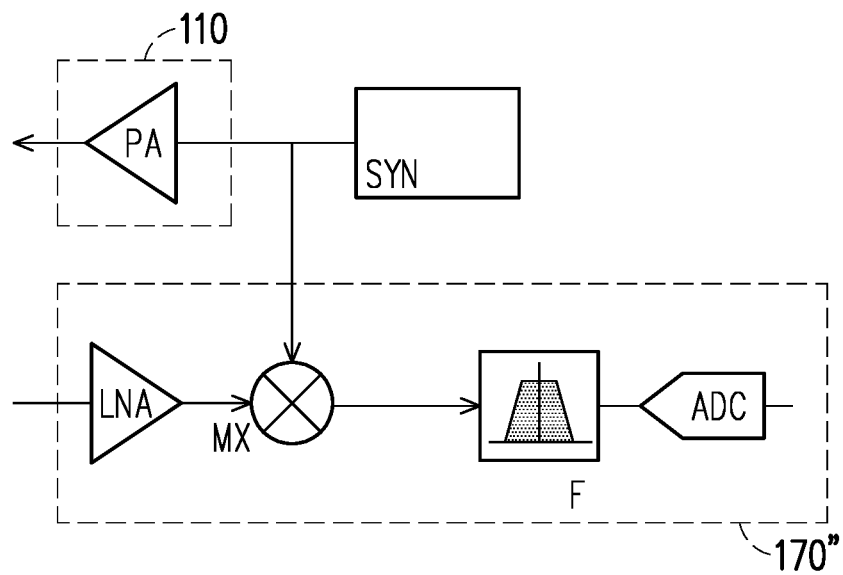
FIG. 6B is a schematic diagram of a transmitting analog front-end circuit and a receiving analog front-end circuit according to an embodiment of the disclosure.

FIG. 6B is a schematic diagram of the transmitting analog front-end circuit 110 and a receiving analog front-end circuit 170" according to an embodiment of the disclosure. In the present embodiment, the transmitting analog front-end circuit 110 includes the amplifier PA. The receiving analog front-end circuit 170" includes the low-noise amplifier LNA, the mixer MX, the filter F, and the analog-to-digital converter ADC. The difference from FIG. 6A is that there is only one mixer MX to mix the radio frequency signal, and there is only one filter F and analog-to-digital converter ADC.

Hereinafter, various members in the radar apparatus 100 are used to describe the method of an embodiment of the disclosure. Each of the processes of the present method may be adjusted according to embodiment conditions and is not limited thereto.

Figure 7:
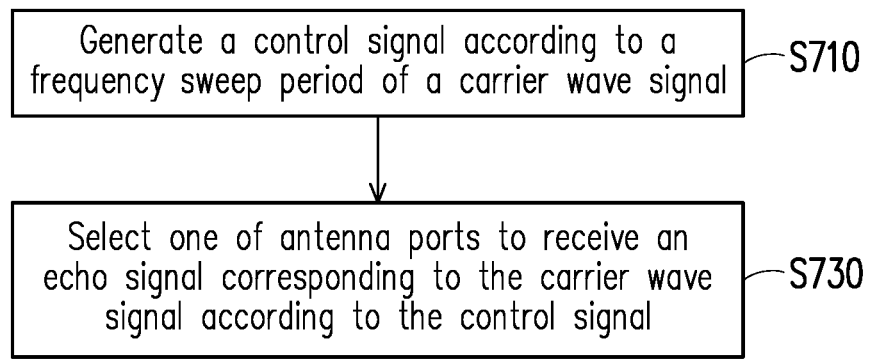
FIG. 7 is a flowchart of a signal processing method according to an embodiment of the disclosure.

FIG. 7 is a flowchart of a signal processing method according to an embodiment of the disclosure. The switching controller 160 may generate a control signal according to the frequency sweep period of the carrier wave signal ST (step S710). Specifically, the carrier wave signal ST and the transmitting signal are as described in above description for the transmitting analog front-end circuit 110, and are not repeated herein. It is worth noting that the frequency sweep period represents the waveform period of the carrier wave signal ST. The control signal is configured to input to the switching circuit 140 and control the operation of the switching circuit 140 accordingly. Since an embodiment of the disclosure adopts a shared receiver (for example, a single receiving analog front-end circuit 170) for the antenna array 130, the radio frequency signals received by the L number of antenna ports $131P_0$ to $131P_{L-1}$ corresponding to different receiving antennas $131_0$ to $131_{L-1}$ may be received via time-division multiplexing (TDM).

In an embodiment, the frame time includes a plurality of receiving periods. The frame time represents the duration of one frame. The subsequent signal demodulation or decoding takes one frame as a unit. Moreover, each receiving period corresponds to the receiving period of any antenna port. It is worth noting that at the same time, the arithmetic processor 150 may select only to receive the radio frequency signal received by one receiving antenna. Therefore, via the switching circuit 140, the L number of antenna ports $131P_0$ to $131P_{L-1}$ corresponding to the receiving antennas $131_0$ to $131_{LA}$ are switched, and the radio frequency signals corresponding to different channels may be received at different time slots to implement TDM. The time slots formed by the receiving antennas switching time are synchronized with the FMCW frequency sweep period.

Figure 8:
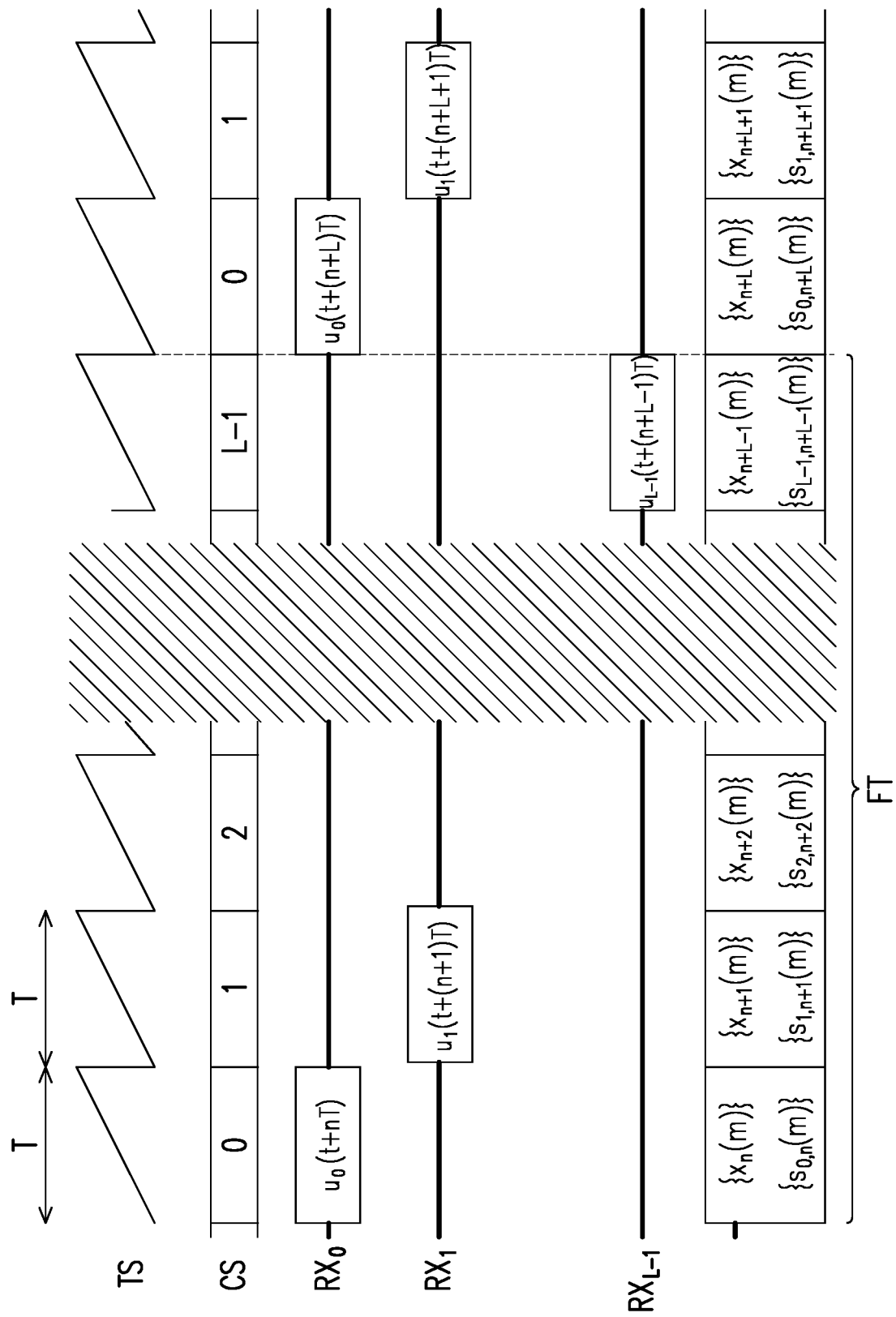
FIG. 8 is a schematic diagram illustrating the corresponding relationship between a transmitting signal, a control signal, and a radio frequency signal according to an embodiment of the disclosure.

For example, FIG. 8 is a schematic diagram illustrating the corresponding relationship between a transmitting signal TS, a control signal CS, and radio frequency signals $u_0(t+nT)$, $u_1(t+(n+1)T)$ to $u_{L-1}(t+(n+L-1)T)$, $u_0(t+(n+L)T)$, $u_1(t+(n+L+1)T)$ from L receiving antennas according to an embodiment of the disclosure (t is time, T is frequency sweep period, and n is a positive integer). In this case, one frame time FT includes an L number of receiving periods. The switching timing of the control signal CS is synchronized with each frequency sweep cycle of the transmitting signal TS. For example, a control signal CS of "0" represents the frequency sweep period corresponding to the first chirp of the transmitting signal TS located at the left side in the figure; a control signal CS of "1" represents the frequency sweep period only corresponding to the second chirp located at the left side in the figure; and the rest may be deduced by analogy. In addition, after the end of the frame period FT, the control signal CS returns to "0", and so on.

Figure 9:
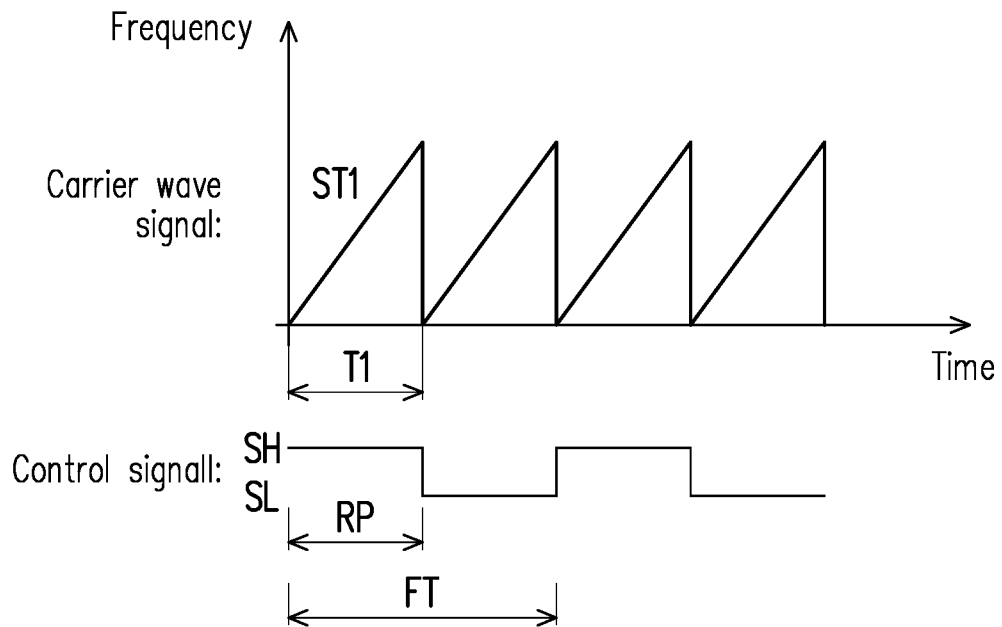
FIGS. 9-12 are schematic diagrams illustrating a receiving period and a frequency sweep period according to embodiments of the disclosure.

FIG. 9 is a schematic diagram illustrating a receiving period RP and a frequency sweep period T1 according to an embodiment of the disclosure. In this case, the antenna array 130 includes two receiving antennas $131_0$ and $131_1$ (i.e., L is 2), and the waveform period of the carrier wave signal ST1 is the frequency sweep period T1. The control signal includes a high level SH and a low level SL. A frame time FT1 includes two receiving periods RP. In particular, the period during which the control signal continues to be at the high level SH is equal to one receiving period RP, and corresponds to the frequency sweep period T1 of one chirp; and the period during which the control signal continues to be at the low level SL is equal to another receiving period RP, and corresponds to the frequency sweep period T1 of another chirp.

It should be noted that the content and sequence of the control signal are not limited to the descriptions of FIG. 8 and FIG. 9 and may be changed according to actual needs.

Figure 10:
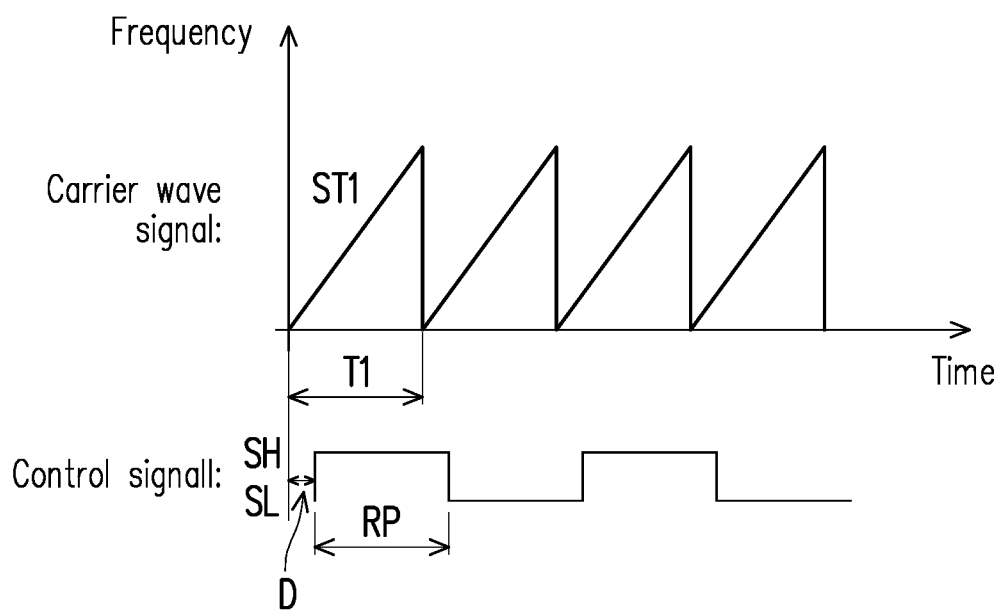

It is worth noting that there may be an error in the synchronization timing of the carrier wave signal ST, the transmitting signal generated by the transmitting analog front-end circuit 110, and the control signal generated by the switching controller 160. In an embodiment, there may be a delay between the starting point of the receiving period and the starting point of the frequency sweep period for relieving the error in the synchronization timing. For example, FIG. 10 is a schematic diagram illustrating the receiving period RP and the frequency sweep period T1 according to an embodiment of the disclosure. Please refer to FIG. 10, which is different from FIG. 9 in that there is a delay D between the starting point of the receiving period RP of the control signal (for example, the high level SH) and the starting point of the frequency sweep period T1. The length of the delay D is much smaller than the frequency sweep period T1. In any case, a portion of the receiving period RP is still overlapped with the frequency sweep period T1.

Referring to FIG. 2A, the switching circuit 140 may select one of the L number of antenna ports 131P$_0$ to 131P$_{L-1}$ corresponding to the receiving antennas 131$_0$ to 131$_{L-1}$ to receive the echo signal (step S730). Specifically, in order to achieve sharing a receiver via the plurality of receiving antennas 131$_0$ to 131$_{L-1}$, such as a single receiver combined with a plurality of receiving antennas, in an embodiment, the switching circuit 140 may select only one of the L number of antenna ports 131P$_0$ to 131P$_{L-1}$ corresponding to the receiving antennas 131$_0$ to 131$_{L-1}$ in each receiving period respectively in the frame time according to the control signal.

Taking FIG. 8 as an example, the antenna array includes an L number of receiving antennas 131$_0$ to 131$_{L-1}$, the frame time FT includes an L number of receiving periods, and the switching circuit 140 may select only the antenna port corresponding to the n$_0$-th receiving antenna in the receiving antennas 131$_0$ to 131$_{L-1}$ in the n-th receiving period respectively in the frame time FT according to the control signal, wherein n$_0$ may correspond to the control signal CS generated by the switching controller 160. Taking FIG. 8 as an example, the control signal CS may correspond to n$_0$, and n$_0$ is the remainder of n divided by L (i.e., n$_0$=n modulo L), which is a positive integer less than or equal to L. In other words, the order of switching antenna ports is related to the order of receiving periods. For example, a control signal CS of "0" means that the receiving period corresponds to the antenna port 131P$_0$ corresponding to the receiving antenna 131$_0$ (for example, only the first receiving antenna is selected), and the radio frequency signal u$_0$(t+nT) is received accordingly; a control signal CS of "1" means only corresponding to the antenna port 131P$_1$ corresponding to the receiving antenna 131$_1$ (for example, only the second receiving antenna is selected), and the radio frequency signal u$_1$(t+(n+1)T) is received accordingly; and the rest may be deduced by analogy.

Moreover, the receiving analog front-end circuit 170 may generate a baseband signal x$_n$(m) according to the radio frequency signal u$_0$(t+nT) received by the antenna port 131P$_0$ corresponding to the receiving antenna 131$_0$, which is defined as s$_{0,n}$(m) (m is the index of digital samples within a receiving period and is a positive integer). For example, the analog-to-digital converter ADC of FIG. 6A generates the baseband signal x$_n$(m) according to the intermediate frequency signal, and a baseband signal x$_{n+1}$(m) may also be generated according to the radio frequency signal u$_1$(t+(n+1)T) received by the antenna port 131P$_1$ corresponding to the receiving antenna 131$_1$, which is defined as s$_{1,n+1}$(m). As another example, the analog-to-digital converter ADC of FIG. 6A generates the baseband signal x$_{n+1}$(m) according to the intermediate frequency signal, and a baseband signal x$_{n+L-1}$(m) may also be generated according to the radio frequency signal u$_{L-1}$(t+(n+L-1)T) received by the antenna port 131P$_{L-1}$ corresponding to the antenna 131$_{L-1}$. The rest may be deduced by analogy, and the baseband signals x$_n$(m) ... x$_{n+L-1}$(m) are generated accordingly, which are s$_{0,n}$(m) ... s$_{L-1,n+L-1}$(m).

Taking FIG. 9 as another example, the control signal CS at the high level SH means that the receiving period only corresponds to the antenna port 131P$_0$ corresponding to the receiving antenna 131$_0$, and the control signal CS at the low level SL means only corresponding to the antenna port 131P$_1$ corresponding to the receiving antenna 131$_1$.

Figure 11:
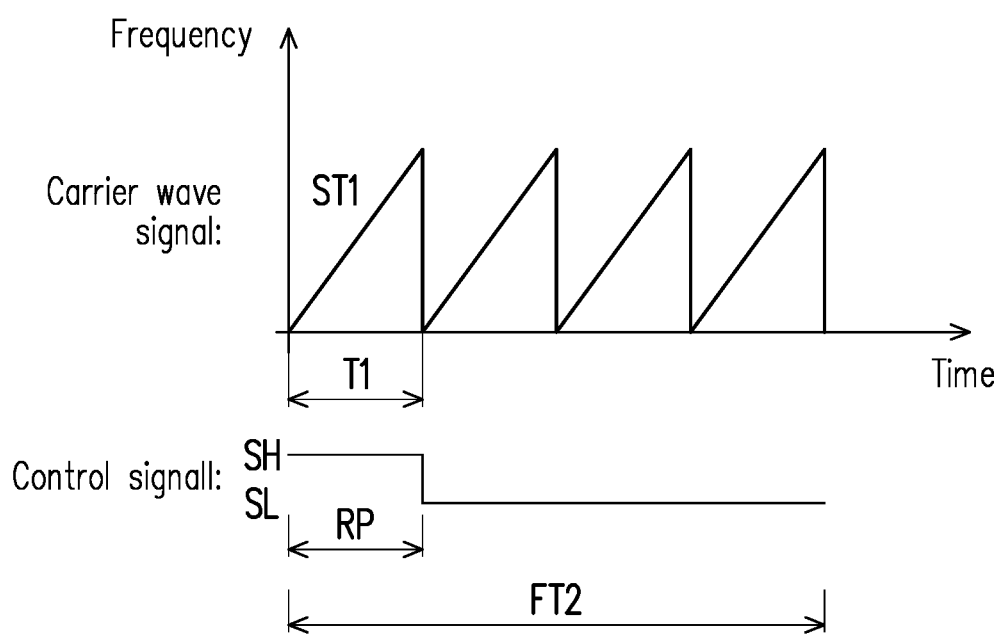

In an embodiment, the antenna array 130 includes an L number of receiving antennas 131$_0$ to 131$_{L-1}$, and the frame time includes an N number of receiving periods. N is a positive integer, and N≥L. That is, the number of the receiving periods RP included in the frame time is not limited to the number of all of the receiving antennas 131$_0$ to 131$_{L-1}$. For example, FIG. 11 is a schematic diagram illustrating the receiving period RP and the frequency sweep period T1 according to an embodiment of the disclosure. A frame time FT2 includes 4 receiving periods RP (that is, N is 4 and corresponds to the frequency sweep periods of 4 chirps), and L is 2. In the first receiving period RP, the control signal is at the high level SH. In the remaining receiving periods RP, the control signal is at the low level SL. Therefore, the switching circuit 140 selects only the antenna port 131P$_0$ corresponding to the antenna 131$_0$ in one of the receiving periods RP in the frame time FT2 according to the control signal, and selects only the antenna port 131P$_1$ corresponding to the antenna 131$_1$ in the other receiving periods RP.

It should be noted that L and N are not limited to the example shown in FIG. 11. For example, L is 4 and N is 8, or L is 6 and N is 12.

In an embodiment of a receiving analog front end with a single mixer and a single analog-to-digital converter ADC, as shown in FIG. 6B, the arithmetic processor 150 may determine the position information of an external object according to a plurality of baseband signals corresponding to the receiving antennas 131$_0$ to 131$_{L-1}$. Specifically, without considering channel interference and noise, the mathematical expression of the baseband signal x$_n$(m) of the n-th receiving antenna 131$_{n-1}$ is as follows (n is a positive integer from 0 to L−1):

$$x_n(m) \approx A \cdot \cos\left(2\pi \frac{2(\eta r_n - f_c v)}{cf_s}m + 2\pi \frac{2f_c}{c}r_n + \varphi\right), 0 \le m < M \quad (1)$$

Figure 1:
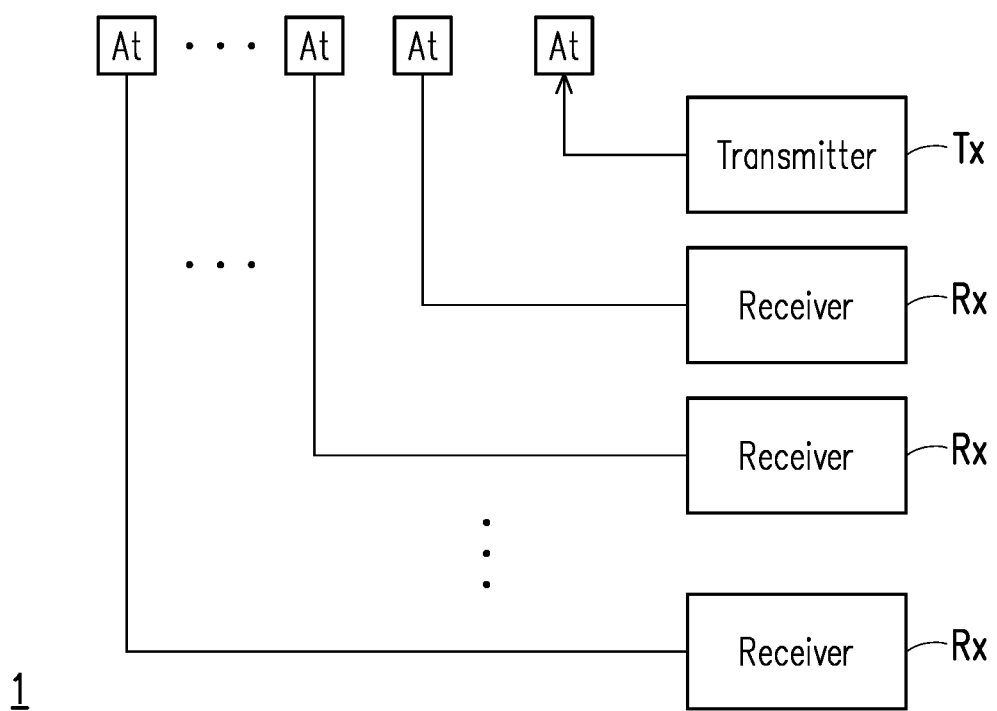
FIG. 1 is a schematic diagram of a conventional FMCW radar system adopting a multi-receiver.

The variables r$_n$ and v respectively represent the distance (included in the position information) and relative speed of the external object O at time nT, and T is the frequency sweep period.

$$\eta = \frac{B}{T}$$

and f$_s$ are the sampling rates, f$_c$ is the carrier wave frequency, B is the bandwidth, and c is the speed of light. A is the amplitude of the reflected power associated with the external object O. The phase φ is associated with the carrier wave signal ST provided by the frequency synthesizer (for example, the frequency synthesizer 105 shown in FIG. 1 or the frequency synthesizer SYN shown in FIG. 6A and FIG. 6B) to the transmitting analog front-end circuit 110 and is configured to generate the initial phase of the transmitting signal. The phase φ is also associated with the accumulated phase delay on the analog and digital signal path. Generally speaking, the phase φ is fixed for each transmitting signal, but is not limited thereto. In the n-th frequency sweep period, $x_n(m)$ has an M number of sampling signals, that is, $M=T \times f_s$.

The mathematical expression of the time domain baseband signal $x_n(m)$ in the frequency domain after discrete Fourier transform (DFT) is as follows:

$$X_n(e^{j\omega}) = A' \cdot e^{j\left(2\pi \frac{2f_c}{c} r_n + \varphi\right)} \Psi(\omega - \omega_n^{(B)}) + A' \cdot e^{-j\left(2\pi \frac{2f_c}{c} r_n + \varphi\right)} \Psi(\omega + \omega_n^{(B)}) \quad (2)$$

Function $\Psi(\omega)$ may be expressed as $$\Psi(\omega) = e^{\frac{j(M-1)}{2}} \cdot \frac{\sin M\omega}{\sin \omega}$$

and $\Psi(0)=1$. The bandwidth B of each beat in the frequency domain is proportional to the width of the function $\Psi(\omega)$, and the width of the function $\Psi(\omega)$ is also called the resolution at the difference frequency $\Delta\omega$. The value obtained by multiplying the resolution of the difference frequency $\Delta\omega$ by $$\frac{1}{2\pi\beta}$$

may correspond to the resolution $\Delta r$ of the distance difference. That is, $$\Delta r = \frac{\Delta\omega}{2\pi\beta} = \frac{c}{2B}.$$

In formula (2), $\omega_n^{(B)}$ is the beat frequency and the mathematical expression thereof is as follows:

$$\omega_n^{(B)} = 2\pi\beta \cdot \left(r_n - \frac{f_c}{\eta} v\right), \beta = \frac{2\eta}{cf_s} \quad (3)$$

It is worth noting that the beat frequency $\omega_n^{(B)}$ may reflect the distance $r_n$ of the external object O. The arithmetic processor 150 may infer the distance in the position information of the external object O according to the position of the spectral peak of the baseband frequency domain signal $X_n(e^{j\omega})$.

In addition, taking FIG. 4 as an example, in this case, the two receiving antennas $131_0$ and $131_1$ are separated by a distance d, wherein the receiving antenna $131_1$ is farther away from the transmitting antenna 120 than the receiving antenna $131_0$. The receiving antenna $131_0$ is separated from the transmitting antenna 120 by a distance b, and the distance from the transmitting antenna 120 to the external object O is R. The round-trip distance $2r_n$ from the transmitting antenna to the external object O receiving antenna $131_0$ may be expressed as $2R+b \cdot \sin \theta$, and the round-trip distance $2r_n$ from the transmitting antenna to the external object O receiving antenna $131_1$ may be expressed as $2R+(d+b) \cdot \sin \theta$. The information of round-trip distance $2r_n$ from the transmitting antenna to the external object O is reflected in the phase $$\left(2\pi \frac{2f_c}{c} r_n + \varphi\right)$$

of the spectral peak of baseband frequency domain signal $X_n(e^{j\omega})$, as shown in equation (3). Based on the phase difference between the spectral peaks of baseband frequency domain signal received by the receiving antenna $131_0$ and the receiving antenna $131_0$, the arithmetic processor 150 may estimate the angle-of-arrival (AoA) using an AoA detection algorithm, and accordingly determine the direction in the position information of the external object O (i.e., the angle θ of the external object O relative to the radar apparatus 100). Common AoA detection algorithms are, for example, multiple signal classification algorithm (MUSIC), root-MUSIC algorithm, or estimation of signal parameters via rotational invariance techniques (ESPRIT) algorithm.

In an embodiment, the arithmetic processor 150 may determine the position information according to the baseband signals within one frame time. One frame time corresponds to a set of continuous and identical receiving periods, and the number of the receiving periods corresponding to each frame time is an even number. Taking FIG. 9 as an example, the arithmetic processor 150 may determine the position information of an external object according to the baseband signals received by the frame time FT (including 2 continuous receiving periods RP). As another example, the arithmetic processor 150 may determine the position information of an external object according to the baseband signals received by the frame time FT2 (including 4 continuous receiving periods RP).

In an embodiment, the arithmetic processor 150 may mitigate a phase bias component affected by the relative speed of the external object O contained in the baseband signals (for example, the baseband signals $s_{0,n}(m)$ to $s_{L-1,n+L-1}(m)$ in FIG. 8, i.e., $x_n(m)$ to $x_{n+L-1}(m)$). It should be mentioned that, in the (n+i)-th period, corresponding to the i-th receiving antenna, the frequency of the beat frequency is the spectral peak position, and the phase information thereof is $$\left(2\pi \frac{2f_c}{c} r_{n+i} + \varphi\right),$$

wherein $2r_{n+i}=2R_n+2 \cdot i \cdot v \cdot T+(i \cdot d+b) \cdot \sin \theta$. The phase information is biased with different i values (corresponding to different receiving antennas) due to the speed v of the external object O. As a result, the estimation of the AoA algorithm based on the phase difference of the baseband frequency domain signal spectral peaks of different receiving antennas in different receiving periods is biased. Therefore, the phase bias component needs to be mitigated to improve the accuracy of angle information estimation.

Figure 12:
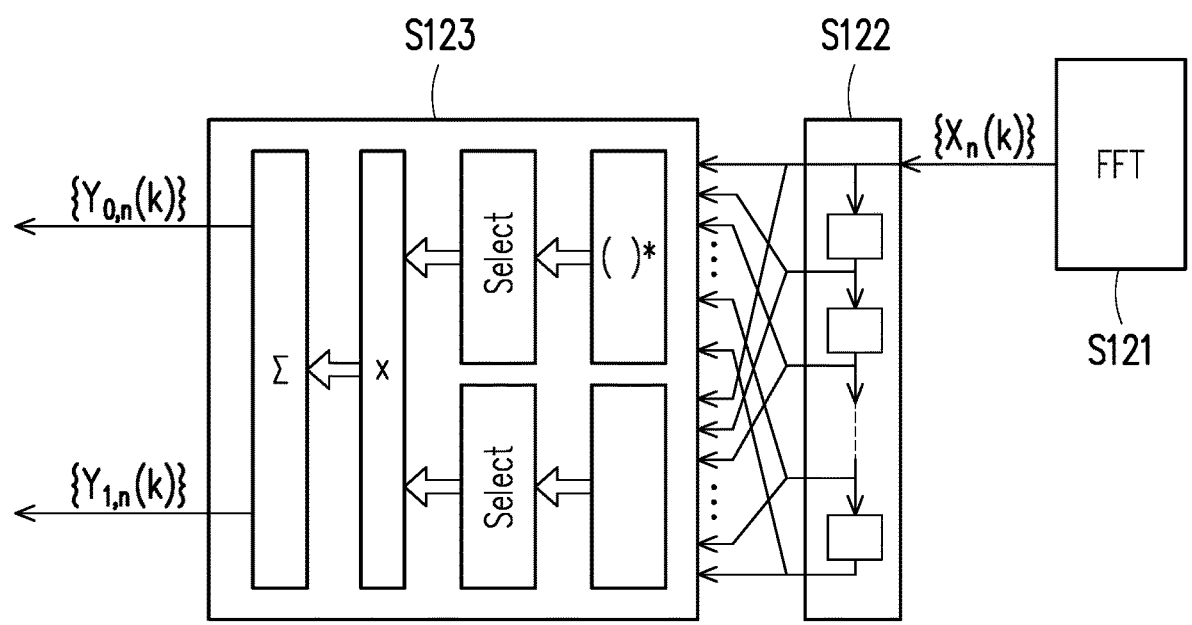

In an embodiment, the arithmetic processor 150 performs a conjugate operation on the two baseband signals in the frequency domain to mitigate the phase bias component caused by the speed of the detected object. Taking the two receiving antennas $131_0$ and $131_1$ shown in FIG. 4 as an example, FIG. 12 is a schematic diagram illustrating the mitigation of a phase bias component according to an embodiment of the disclosure. Referring to FIG. 4 and FIG. 12, in step S121, the arithmetic processor 150 respectively performs Fast Fourier Transform (FFT) on the baseband signals corresponding to different receiving periods to obtain the baseband signal $X_n(k)$ in the frequency domain.

In step S122, the arithmetic processor 150 temporarily stores the baseband signal $X_n(k)$ corresponding to different receiving periods in a buffer.

In step S123, the arithmetic processor 150 reads the baseband signals $X_n(k)$ within one frame time. For example, FIG. 9 shows the baseband domain signal $X_n(k)$ of two receiving periods RP, and FIG. 11 shows the baseband signal $X_n(k)$ of four receiving periods RP. The arithmetic processor 150 performs a conjugation operation on the baseband frequency domain signals $\{X_n(k), X_{n+1}(k), \ldots, X_{n+L-1}(k)\}$ temporarily stored in the buffer within one frame time, and then selects portions of baseband frequency domain signals in various periods to form complex multiplication products and combines the products to generate the baseband frequency domain signals $Y_{0,n}(k)$ and $Y_{1,n}(k)$. For example, in FIG. 9, we form the product of the complex conjugate of the baseband frequency domain signal of any receiving period RP and the baseband frequency domain signal of another receiving period RP. As another example, in FIG. 11, we form the product of the complex conjugate of the baseband frequency domain signal of the first receiving period RP and the baseband frequency domain signal of the third receiving period RP, but is not limited thereto. The result of the conjugate/selection/linear total combination operation may mitigate the phase bias component affected by the relative speed.

More specifically, in the n-th receiving period, the distance between the external object O and the antenna array 130 may be expressed as $R_n$, and the round-trip distance from the transmitting antenna 120 to the antenna $131_0$ may be expressed as $2R_n + b \cdot \sin\theta$. In the n+1-th receiving period, the round-trip distance from the transmitting antenna 120 to the antenna $131_1$ may be expressed as $2R_n + 2 \cdot v \cdot T + (d+b) \cdot \sin\theta$, wherein v is the relative speed of the external object O, and T is the frequency sweep period. The baseband signal corresponding to the receiving antenna $131_0$ may be expressed as $s_{0,n}(m)$ (i.e., $x_n(m)$), and the baseband signal corresponding to the antenna $131_1$ may be expressed as $s_{1,n+1}(m)$ (i.e., $x_{n+1}(m)$). After the baseband signals $S_{0,n}(m)$ and $S_{1,n+1}(m)$ undergo Fast Fourier Transform (FFT), the positive frequency portion ($0 \leq \omega < \pi$) may be expressed as:

$$S_{0,n}(k) \triangleq X_n(k) = X_n(e^{j\omega})\big|_{\omega=2\pi k/M} \tag{4}$$

$$\text{wherein, } X_n(e^{j\omega}) \approx \frac{A}{R_n} \cdot E(\theta) \cdot e^{j\frac{4\pi f_c}{c} r_n} \cdot \Psi(\omega - \omega_n^{(B)}) \text{ and} \tag{5}$$

$$S_{1,n+1}(e^{j\omega}) \triangleq X_{n+1}(k) = X_{n+1}(e^{j\omega})\big|_{\omega=2\pi k/M} \text{ wherein,}$$

$$X_{n+1}(e^{j\omega}) \approx \frac{A}{R_n} \cdot E(\theta) \cdot e^{j\frac{4\pi f_c}{c} r_n} \cdot e^{j\frac{4\pi f_c}{c} vT} \cdot e^{j\frac{2\pi}{\lambda} d \cdot \sin\theta} \cdot \Psi(\omega - \omega_n^{(B)})$$

In particular, M is the number of sampling points of $x_n(m)$ in one receiving period, and $E(\theta)$ is the antenna beam pattern. The phase difference of the spectral peak of the baseband frequency domain signals $S_{0,n}(k)$ and $S_{1,n+1}(k)$ does not correctly reflect the expected $$\frac{2\pi}{\lambda} d \cdot \sin\theta,$$

but is biased by $$\frac{4\pi f_c}{c} vT,$$

thus causing the estimated bias of the AoA algorithm.

The arithmetic processor 150 may store the baseband frequency domain signals $S_{0,n}(k)$ and $S_{1,n+1}(k)$ (that is, $X_n(k)$ and $X_{n+1}(k)$) received in different receiving periods in the buffer.

The arithmetic processor 150 may obtain the following baseband frequency domain signals $Y_{0,n}(k)$ and $Y_{1,n}(k)$ via the linear combination operation of the selective product of the baseband frequency domain signals $S_{0,n}(m)$ and $S_{1,n+1}(m)$ in the buffer with the unconjugated complex or the complex conjugate thereof, wherein $$Y_{0,n}(k) = Y_{0,n}(e^{j\omega})\big|_{\omega=2\pi k/M}, Y_{1,n}(k) = Y_{1,n}(e^{j\omega})\big|_{\omega=2\pi k/M}, \text{ and} \tag{6}$$

$$Y_{0,n}(e^{j\omega}) = \frac{A^2}{R_n^2} \cdot |E(\theta)|^2 \cdot e^{j\varphi} \cdot |\Psi(\omega - \omega_n^{(B)})|^2$$

$$Y_{1,n}(e^{j\omega}) = \frac{A^2}{R_n^2} \cdot |E(\theta)|^2 \cdot e^{j\varphi} \cdot e^{j\frac{2\pi}{\lambda} d \sin\theta} \cdot |\Psi(\omega - \omega_n^{(B)})|^2 \tag{7}$$

In particular, the phase φ may or may not be affected by the relative speed v of the external object O, but the phase φ is equal in the two baseband frequency domain signals $Y_{0,n}(e^{j\omega})$ and $Y_{1,n}(e^{j\omega})$.

It is worth noting that at the beat frequency $\omega_n^{(B)}$, the phase difference between the spectral peaks of the two frequency domain signals $Y_{0,n}(e^{j\omega})$ and $Y_{1,n}(e^{j\omega})$ is $$\frac{2\pi}{\lambda} d \cdot \sin\theta$$

and is only related to the angle θ of the external object O relative to the radar apparatus 100. Therefore, the subsequent estimation of the AoA is not readily affected by the relative velocity v.

It should be noted that the above embodiment assumes that there is only one external object O. However, the embodiments of the disclosure are also applicable to detecting a plurality of external objects O. In this case, there are a K number of external objects O, wherein K is a positive integer greater than one. Taking the two receiving antennas $131_0$ and $131_1$ shown in FIG. 4 as an example, the operations (such as complex conjugate, selection, summation, or linear combination) are performed on the baseband frequency domain signals $Y_0(k)$ and $Y_1(k)$ wherein $$Y_0(k) = Y_0(e^{j\omega})\big|_{\omega=2\pi k/M}, Y_1(k) = Y_1(e^{j\omega})\big|_{\omega=2\pi k/M}, \text{ and} \tag{8}$$

$$Y_0(e^{j\omega}) = \sum_{1 \leq i \leq K} \frac{A_i^2}{R_i^2} \cdot |E(\theta)|^2 \cdot e^{j\varphi} \cdot |\Psi(\omega - \omega_i^{(B)})|^2 + N_0(e^{j\varphi})$$

$$Y_1(e^{j\omega}) = \sum_{1 \leq i \leq K} \frac{A_i^2}{R_i^2} \cdot |E(\theta)|^2 \cdot e^{j\varphi} \cdot e^{j\frac{2\pi}{\lambda} d \sin\theta_i} \cdot |\Psi(\omega - \omega_i^{(B)})|^2 + N_1(e^{j\varphi}) \tag{9}$$

$N_0(e^{j\varphi})$ and $N_1(e^{j\varphi})$ are noise and have no correlation with the desired radar signal. The i-th external object is located at an angle of $\theta_i$ and a distance of $R_i$. In addition, $\omega_i^{(B)}$ is the beat frequency of the i-th external object corresponding to the distance $R_i$.

Based on the above, the radar apparatus and the signal processing method thereof provided by the embodiments of the disclosure switch between a plurality of antenna ports in a time-division multiplexing manner, and receive the signal of each channel in different receiving periods accordingly. In this way, the embodiments of the disclosure may effectively cut down on the hardware of the analog front-end circuits. Even when there is a need to deploy a large number of radar systems, the embodiments of the disclosure may simplify the hardware architecture of the receiving end, and greatly reduce the cost of deploying the radar system.

Although the disclosure has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A radar apparatus, comprising:
    a transmitting analog front-end circuit configured to generate a transmitting signal according to a carrier wave signal, wherein a frequency of the carrier wave signal changes with time within a frequency sweep period of the carrier wave signal;
    a plurality of antenna ports, wherein the antenna ports are respectively configured to receive a radio frequency signal corresponding to an echo signal, wherein the echo signal is generated by a reflection of the transmitting signal by an object;
    a switching controller coupled to the transmitting analog front-end circuit and configured to generate a control signal with a receiving period according to the frequency sweep period of the carrier wave signal;
    a switching circuit coupled to the antenna ports and the switching controller and configured to select one of the antenna ports to receive the radio frequency signal according to the receiving period of the control signal, wherein the receiving period and the frequency sweep period are a same period, and thus the transmitting signal and the control signal are switched according to the same period of carrier wave signal; and
    a receiving analog front-end circuit coupled to the switching circuit and configured to receive the radio frequency signal according to the carrier wave signal and the echo signal.

2. The radar apparatus of claim 1, wherein a frame time comprises a plurality of the receiving periods, the switching circuit is configured to select only one of the antenna ports in each of the receiving periods respectively in the frame time according to the control signal, and the receiving period corresponds to the frequency sweep period.

3. The radar apparatus of claim 2, wherein the antenna ports comprise an L number of antenna ports, the frame time comprises the L number of receiving periods, and the switching circuit is configured to select only an $n_0$-th antenna port in the antenna ports in an n-th receiving period respectively in the frame time according to the control signal, wherein L is a positive integer, and $n_0$ is a positive integer less than or equal to L.

4. The radar apparatus of claim 2, wherein the antenna ports comprise an L number of antenna ports, and the frame time comprises an N number of receiving periods, wherein N and L are positive integers, and N is greater than or equal to L.

5. The radar apparatus of claim 4, wherein L is 2, the switching circuit is configured to select only a first antenna port in the antenna ports in one of the receiving periods in the frame time according to the control signal, and select only a second antenna port in the antenna ports in other receiving periods.

6. The radar apparatus of claim 2, wherein a delay is between a starting point of the receiving period and a starting point of the frequency sweep period, and a length of the delay is less than the frequency sweep period.

7. The radar apparatus of claim 1, wherein the antenna ports comprise a first antenna port and a second antenna port, the receiving analog front-end circuit generates a first baseband signal according to the radio frequency signal received by the first antenna port, and the receiving analog front-end circuit generates a second baseband signal according to the radio frequency signal received by the second antenna port.

8. The radar apparatus of claim 7, further comprising:
    an arithmetic processor configured to determine a position information of an external object according to the first baseband signal and the second baseband signal.

9. The radar apparatus of claim 1, further comprising:
    a frequency synthesizer configured to generate the carrier wave signal.

10. The radar apparatus of claim 7, wherein the receiving analog front-end circuit comprises:
    an amplifier coupled to the switching circuit and configured to receive the radio frequency signal according to the carrier wave signal;
    a mixer coupled to the amplifier and configured to generate an intermediate frequency signal according to the radio frequency signal; and
    an analog-to-digital converter coupled to the mixer and configured to generate the first baseband signal or the second baseband signal according to the intermediate frequency signal.

11. The radar apparatus of claim 8, further comprising an antenna array, comprising a first receiving antenna and a second receiving antenna respectively coupled to the first antenna port and the second antenna port, wherein the arithmetic processor is configured to mitigate a phase bias component in the second baseband signal affected by a relative speed of the external object, wherein the second receiving antenna is farther away from a transmitting antenna than the first receiving antenna, and the transmitting signal is transmitted via the transmitting antenna.

12. The radar apparatus of claim 11, wherein the arithmetic processor is configured to select a conjugation operation and a linear combination operation for the first baseband signal and the second baseband signal in a frequency domain to mitigate the phase bias component.

13. The radar apparatus of claim 8, wherein the arithmetic processor is configured to determine the position information according to the first baseband signal and the second baseband signal during a frame time, the frame time corresponds to a plurality of continuous and identical receiving periods, and a number of the receiving periods corresponding to each of the frame times is an even number.

14. A signal processing method suitable for a radar apparatus having a plurality of antenna ports, wherein a transmitting signal of the radar apparatus is generated according to a carrier wave signal, and the signal processing method comprises:
    generating a control signal with a receiving period according to a frequency sweep period of the carrier wave signal, wherein a frequency of the carrier wave signal changes with time during the frequency sweep period of the carrier wave signal; and
    selecting one of the antenna ports to receive a radio frequency signal corresponding to an echo signal according to the receiving period of the control signal, wherein the echo signal is generated by a reflection of the transmitting signal by an object, and the receiving period and the frequency sweep period are a same period, and thus the transmitting signal and the control signal are switched according to the same period of carrier wave signal.

15. The signal processing method of claim 14, wherein a frame time comprises a plurality of the receiving periods, and the step of selecting one of the antenna ports to receive the radio frequency signal corresponding to the echo signal according to the control signal comprises:
selecting only one of the antenna ports in each of the receiving periods respectively in the frame time according to the control signal, and the receiving period corresponds to the frequency sweep period.

16. The signal processing method of claim 15, wherein the antenna ports comprise an L number of antenna ports, the frame time comprises the L number of receiving periods, and the step of selecting only one of the antenna ports in each of the receiving periods respectively in the frame time according to the control signal comprises:
selecting only an $n_0$-th antenna port in the antenna ports in an n-th receiving period respectively in the frame time according to the control signal, wherein L is a positive integer, and $n_0$ is a positive integer less than or equal to L.

17. The signal processing method of claim 15, wherein the antenna ports comprise an L number of antenna ports, and the frame time comprises an N number of receiving periods, wherein N and L are positive integers, and N is greater than or equal to L.

18. The signal processing method of claim 15, wherein a delay is between a starting point of the receiving period and a starting point of the frequency sweep period, and a length of the delay is less than the frequency sweep period.

19. The signal processing method of claim 14, wherein the antenna ports comprise a first antenna port and a second antenna port, and the step of selecting one of the antenna ports to receive the radio frequency signal corresponding to the echo signal according to the control signal comprises:
generating a first baseband signal according to a radio frequency signal received by the first antenna port;
generating a second baseband signal according to a radio frequency signal received by the second antenna port; and
determining a position information of an external object according to the first baseband signal and the second baseband signal.

20. The signal processing method of claim 19, wherein the step of selecting one of the antenna ports to receive the radio frequency signal corresponding to the echo signal according to the control signal comprises:
determining the position information according to the first baseband signal and the second baseband signal during a frame time, wherein the frame time corresponds to a plurality of continuous and identical receiving periods, and a number of the receiving periods corresponding to each of the frame times is an even number.

* * * * *